(12) United States Patent
Aga et al.

(10) Patent No.: US 12,474,926 B2
(45) Date of Patent: Nov. 18, 2025

(54) FUSED DATA GENERATION AND ASSOCIATED COMMUNICATION

(71) Applicant: Advanced Micro Devices, Inc., Santa Clara, CA (US)

(72) Inventors: Shaizeen Dilawarhusen Aga, Santa Clara, CA (US); Suchita Pati, Madison, WI (US); Nuwan S. Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 13 days.

(21) Appl. No.: 18/190,620

(22) Filed: Mar. 27, 2023

(65) Prior Publication Data

US 2024/0201990 A1  Jun. 20, 2024

Related U.S. Application Data (60) Provisional application No. 63/387,434, filed on Dec. 14, 2022.

(51) Int. Cl.
*G06F 9/38* (2018.01)
*G06F 9/30* (2018.01)

(52) U.S. Cl.
CPC ........ *G06F 9/30036* (2013.01); *G06F 9/3834* (2013.01)

(58) Field of Classification Search
None
See application file for complete search history.

(56) References Cited

U.S. PATENT DOCUMENTS

| | | | |
|---|---|---|---|
| 6,417,797 B1 | 7/2002 | Cousins et al. | |
| 8,713,197 B1 | 4/2014 | Li | |
| 9,160,607 B1* | 10/2015 | Froese | G06F 9/524 |
| 9,632,832 B2* | 4/2017 | Solihin | G06F 11/3471 |
| 10,771,589 B1* | 9/2020 | Brito | H04L 67/306 |
| 11,442,945 B1* | 9/2022 | Tsai | G06F 16/2379 |
| 2008/0046666 A1* | 2/2008 | Termaine | G06F 13/28 |
| | | | 711/205 |
| 2011/0107059 A1 | 5/2011 | Oh et al. | |
| 2016/0162424 A1 | 6/2016 | Dobbs et al. | |
| 2018/0107510 A1 | 4/2018 | Carlough et al. | |

(Continued)

FOREIGN PATENT DOCUMENTS

CN    120344964 A    7/2025

OTHER PUBLICATIONS

Gasparakis, Harris, "US Application as Filed", U.S. Appl. No. 18/091,441, filed Dec. 30, 2022, 48 pages.

(Continued)

*Primary Examiner* — Michael Sun
(74) *Attorney, Agent, or Firm* — FIG. 1 Patents (57) ABSTRACT

Fused data generation and associated communication techniques are described. In an implementation, a system includes processing system having a plurality of processors. A data generation and communication tracking module is configured to track programmatically defined data generation and associated communication as performed by the plurality of processors. A targeted communication module is configured to trigger targeted communication of data between the plurality of processors based on the tracked programmatically defined data generation and associated communication.

20 Claims, 9 Drawing Sheets

(56) References Cited

U.S. PATENT DOCUMENTS

| | | | | |
|---|---|---|---|---|
| 2018/0329958 | A1* | 11/2018 | Choudhury | G06F 16/2456 |
| 2019/0102574 | A1* | 4/2019 | Roberts | G06N 5/01 |
| 2021/0027136 | A1* | 1/2021 | Hwang | G06F 9/542 |
| 2022/0029986 | A1* | 1/2022 | Neumann | G16H 10/60 |
| 2023/0195375 | A1* | 6/2023 | Puthoor | G06F 3/0659 |
| | | | | 711/154 |
| 2023/0342588 | A1* | 10/2023 | Kramer | G06N 3/042 |

OTHER PUBLICATIONS

Pati, Suchita, et al., "US Application as Filed", U.S. Appl. No. 18/091,443, filed Dec. 30, 2022, 48 pages.

Rajbhandari, Samyam, et al., "ZeRO: Memory Optimizations Toward Training Trillion Parameter Models", Cornell University arXiv, arXiv.org [retrieved May 4, 2023]. Retrieved from the Internet <https://arxiv.org/pdf/1910.02054.pdf%BE>., May 13, 2020, 24 Pages.

PCT/US2023/082982, "International Search Report and Written Opinion", International Application No. PCT/US2023/082982, Apr. 19, 2024, 8 pages.

\* cited by examiner

FUSED DATA GENERATION AND ASSOCIATED COMMUNICATION

RELATED APPLICATIONS

This application claims priority to U.S. Provisional Patent Application No. 63/387,434, filed Dec. 14, 2022, and titled "Fused Data Generation and Associated Communication," the entire disclosure of which is hereby incorporated by reference.

BACKGROUND

Processing systems are configurable to include a plurality of processors in order to improve computational efficiency, e.g., through use of multiple cores of a central processing unit, graphics processing units, and so forth. A computation, for instance, is performable using multiple processors by alternating between computation and associated communication of data resulting from the computation between the processors. Consequently, scenarios involving increased amounts of communication between the processors (e.g., machine learning) have a direct effect on overall device operation and computational efficiency.

BRIEF DESCRIPTION OF THE DRAWINGS

The detailed description is described with reference to the accompanying FIGURES.

DETAILED DESCRIPTION

Overview

In real world scenarios, it is common practice across domains to divide up a computation (e.g., deep learning training) across multiple processors (e.g., GPUs) and alternate between computation (e.g., calculate weight gradient via a GEMM computation) and associated communication, e.g., reduce-scatter computation to reduce weight gradients across GPUs. With scaling along multiple dimensions (e.g., neural network sizes, datasets), communication continues to increase and as such, communication optimization has a direct effect on overall device operation.

Large scale deep neural networks (DNN), for instance, typically rely on distributed training. This training involves partitioning parameters and activations across nodes which, along with techniques such as data-parallel training, involve reduction across nodes of these structures in each training iteration. That is, each node generates data for these structures independently and in each training iteration, this generated data is communicated between the participating processors and reduced.

To solve these problems, fused data generation and associated communication techniques are described. These techniques are configured through use of augmented components, examples of which include a targeted communication module, a data generation and communication tracking module, and an updates convergence unit. This supports a variety of technical advantages including concurrent utilization of compute/network, performance, energy efficiency improvement, avoidance of separate kernel launches for compute/communication, and so forth. A variety of other instances are also contemplated, examples of which are described in the following discussion and shown using corresponding figures.

In some aspects, the techniques described herein relate to a system including a processing system including a plurality of processors, at least one processor of the plurality of processors configured to track programmatically defined data generation and associated communication as performed by the plurality of processors, and trigger targeted communication of data between the plurality of processors based on the tracked programmatically defined data generation and associated communication.

In some aspects, the techniques described herein relate to a system, wherein the programmatically defined data generation and associated communication includes generation of the data by the at least one processor and a targeted update to transmit the data by the at least one processor to another processor of the plurality of processors.

In some aspects, the techniques described herein relate to a system, wherein the targeted update is triggered upon completion of the generation of the data by the at least one processor.

In some aspects, the techniques described herein relate to a system, wherein the targeted update is triggered based on a remote communication event received at the at the at least one processor as implemented by a data mover engine by another processor of the plurality of processors.

In some aspects, the techniques described herein relate to a system, wherein the remote communication event is part of a bulk operation involving communication of the data.

In some aspects, the techniques described herein relate to a system, wherein the programmatically defined data generation and associated communication are defined using a single fused data generation and associated communication operation.

In some aspects, the techniques described herein relate to a system, wherein the fused data generation and associated communication operation identifies another processor of the plurality of processors to receive the data.

In some aspects, the techniques described herein relate to a system, wherein the fused data generation and associated communication operation identifies an address range that is a source of the data or an address range that is a destination to transmit the data.

In some aspects, the techniques described herein relate to a system, wherein the at least one processor is further configured to support concurrent updates to the data in physical memory.

In some aspects, the techniques described herein relate to a system, wherein a processor-in-memory component of a memory module that includes the physical memory is configured to implement the concurrent updates.

In some aspects, the techniques described herein relate to a system, wherein programmatically defined data generation and associated communication is configured to control a data generation order by respective processors of the plurality of processors.

In some aspects, the techniques described herein relate to a device including a processing system including a plurality of processors, at least one processor of the plurality of processor configured to trigger targeted communication of data between the at least one processor and another processor of plurality of processors as part of programmatically defined data generation and associated communication, and resolve concurrent updates to the data in physical memory.

In some aspects, the techniques described herein relate to a device, wherein a processor-in-memory component of a memory module that includes the physical memory is configured to resolve the concurrent updates to the data in the physical memory.

In some aspects, the techniques described herein relate to a device, wherein the at least one processor is further configured to track the programmatically defined data generation and associated communication as performed by the plurality of processors and trigger the targeted communication based on the tracked programmatically defined data generation and associated communication.

In some aspects, the techniques described herein relate to a device, wherein the targeted communication is configured to be performed based on to a single fused data generation and associated communication operation performed by the at least one processor and that identifies another of the plurality of processors, to which, the data is to be transmitted.

In some aspects, the techniques described herein relate to a method including tracking programmatically defined data generation and associated communication as performed between a plurality of processors of a processing system, triggering targeted communication of data between the plurality of processors as part of the programmatically defined data generation and associated communication, and resolving concurrent updates to physical memory involving the data generated by the plurality of processors.

In some aspects, the techniques described herein relate to a method, wherein the programmatically defined data generation and associated communication is configured to control a data generation order by respective processors of the plurality of processors.

In some aspects, the techniques described herein relate to a method, wherein the programmatically defined data generation and associated communication is configured to identify a particular processor of the plurality of processors that is to receive the data.

In some aspects, the techniques described herein relate to a method, wherein the programmatically defined data generation and associated communication is configured to identify an address range that is a source of the data or an address range that is a destination to transmit the data.

In some aspects, the techniques described herein relate to a method, wherein the programmatically defined data generation and associated communication includes generation of the data by a first processor of the plurality of processors and a targeted update to transmit the data by the first processor to a second processor of the plurality of processors.

Figure 1:
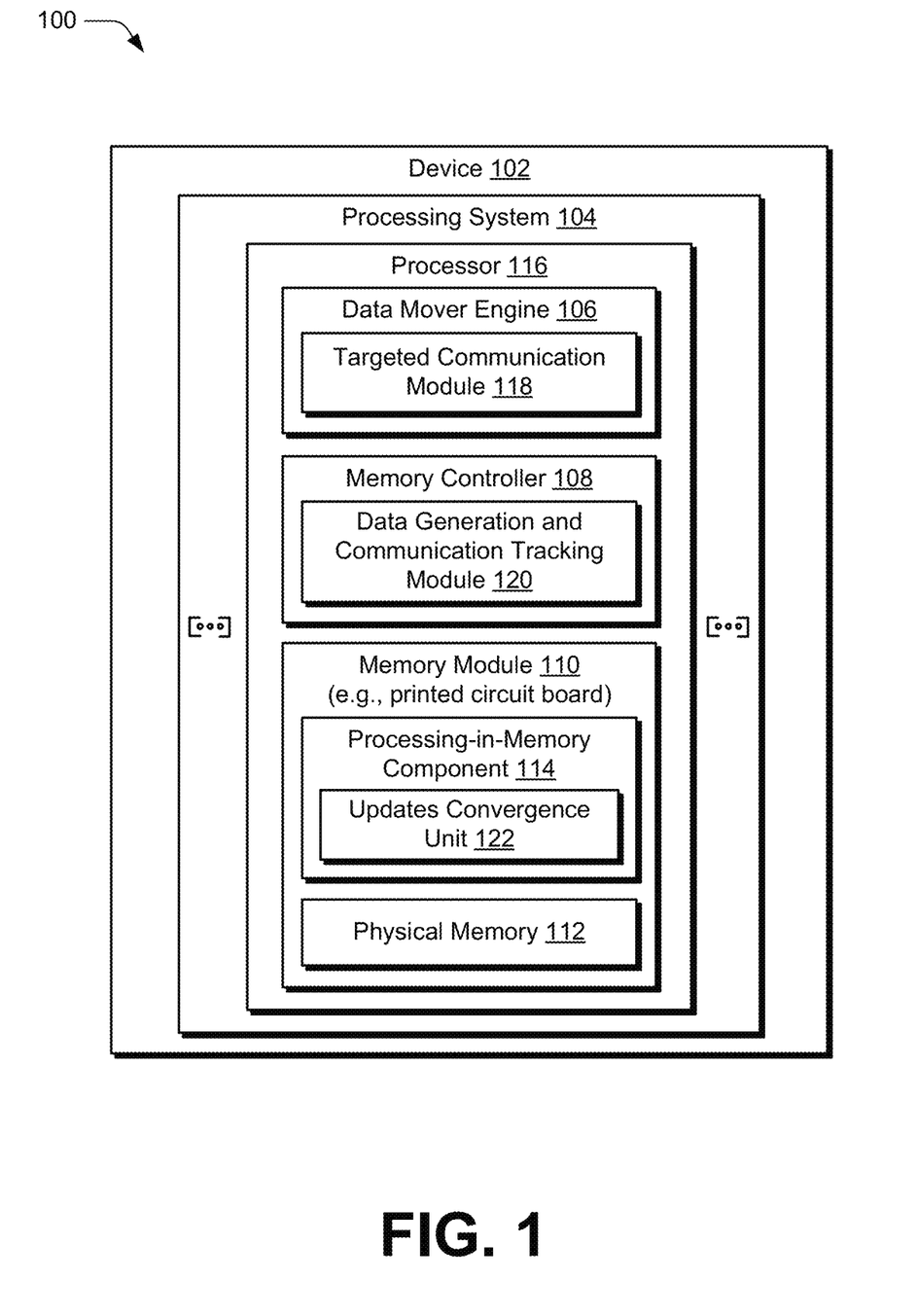
FIG. 1 is a block diagram of a non-limiting example infrastructure configured to employ fused data generation and associated communication techniques.

FIG. 1 is a block diagram of a non-limiting example infrastructure 100 configured to employ fused data generation and associated communication. The infrastructure 100 includes a device 102 having a processing system 104. The processing system 104 includes a data mover engine 106, memory controller 108, and memory module 110 having physical memory 112 and a processing-in-memory component 114. Examples of physical memory 112 include random access memory (e.g., double data rate synchronous dynamic random-access memory) as implemented using one or more integrated circuits. The processing-in-memory component 114 is configurable as an integrated circuit that includes both processing components and memory components implemented in hardware. The processing system 104 implements a plurality of processors, examples of which are illustrated as processor 116. The processor 116 is representative of at least one processor that implements functionality represented by the data mover engine 106 and memory controller 108. The memory module 110 is configured, in one example, as a printed circuit board, on which, the physical memory 112 and the processing-in-memory component 114 are mounted. The memory module 110 is communicatively coupled to the processor, e.g., via one or more buses on a motherboard that implements at least a portion of the device 102. Processors are configurable as central processing units, auxiliary processing units such a graphics processing units, and so forth.

Examples of device 102 configurations include, by way of example and not limitation, computing devices, servers, mobile devices (e.g., wearables, mobile phones, tablets, laptops), processors (e.g., graphics processing units, central processing units, and accelerators), digital signal processors, interference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders.

The techniques described herein implement mechanisms and primitives to efficiently support fusion of data generation and associated communication. In real world scenarios, it is common practice across domains to divide up a computation (e.g., deep learning training) across multiple processors (e.g., GPUs) and alternate between computation (e.g., calculate weight gradient via a GEMM computation) and associated communication, e.g., reduce-scatter computation to reduce weight gradients across GPUs. With scaling along multiple dimensions (e.g., neural network sizes, datasets), communication continues to increase and as such, communication optimization has a direct effect on overall device operation.

To this end, the infrastructure 100 includes augmented components, examples of which include a targeted communication module 118 included as part of the data mover engine 106 and a data generation and communication tracking module 120. The infrastructure 100 also supports data synchronization using an updates convergence unit 122 configured to leverage near/in-memory offloads as an efficient synchronization substrate to support concurrent data generation and associated communication. The data mover engine 106, target communication module 118, data generation and communication tracking module 120, and updates convergence unit 122 are implemented in any of hardware, software, firmware, or a combination thereof. In one example, these modules and units are configured as a microcontroller to perform a variety of the operations for fused data management as discussed below. In another example, the modules and units are implemented using hardware, such as an Application Specific Integrated Circuit (ASIC) or other integrated circuit (IC) to perform a variety of the operations for fused data management as discussed below This supports a variety of technical advantages including concurrent utilization of compute/network, performance, energy efficiency improvement, avoidance of separate kernel launches for compute/communication, and so forth.

The processing system 104, for instance, is configured to support a scenario is which data generated locally on a first processor (e.g., processor 116) is to be communicated to another processor of the plurality of processors involved in an overall computation. In the following discussion, one such example involves training a machine-learning model.

Large scale deep neural networks (DNN), for instance, typically rely on distributed training. This training involves partitioning parameters and activations across nodes which, along with techniques such as data-parallel training, involve reduction across nodes of these structures in each training iteration as part of a "reduce-scatter operation." That is, each node generates data for these structures independently and in each training iteration, this generated data is communicated between the participating processors and reduced.

Data generation and associated communication fusion are used, as a single fused operation, to perform these operations concurrently while also reducing redundant memory traffic. This supports several technical advantages including increased operational performance and energy efficiency of the device 102, concurrent utilization of compute and network resources instead of serialized utilization, a lower number the of task/kernel launches, and so forth. While fusion of data generation and associated communication has several benefits, in some scenarios this is too complex to implement solely using software. An example of this involves data generation via a general matrix-matrix multiplication (GEMM) operation and communication via a reduce-scatter operation.

To address these challenges, the infrastructure 100 programmatically fuses data generation and associated communication, i.e., in a programmer-defined fashion. This is implemented in the infrastructure 100 of FIG. 1 through augmentations to the memory controller 108 through use of a data generation and communication tracking module 120 to track data generation and communication. The memory controller 108 is a digital circuit that is configured to manage the flow of data going to and from the physical memory 112. A targeted communication module 118 is utilized, as implemented in a data mover engine 106, to trigger targeted communication, e.g., as transmissions to a defined address range (e.g., contiguous or noncontiguous), a defined processor, and so forth. The address range is configurable as an address range that is a source of the data or an address range that is a destination to transmit the data. Further, an updates convergence unit 122 is also implemented in the illustrated example as supporting compute operations that are often associated with communication (e.g., reduction operation in a reduce-scatter operation) through use of near/in-memory processing to use physical memory 112 as a synchronization point. This supports local and remote updates to data at a relatively low synchronization cost.

Figure 2:
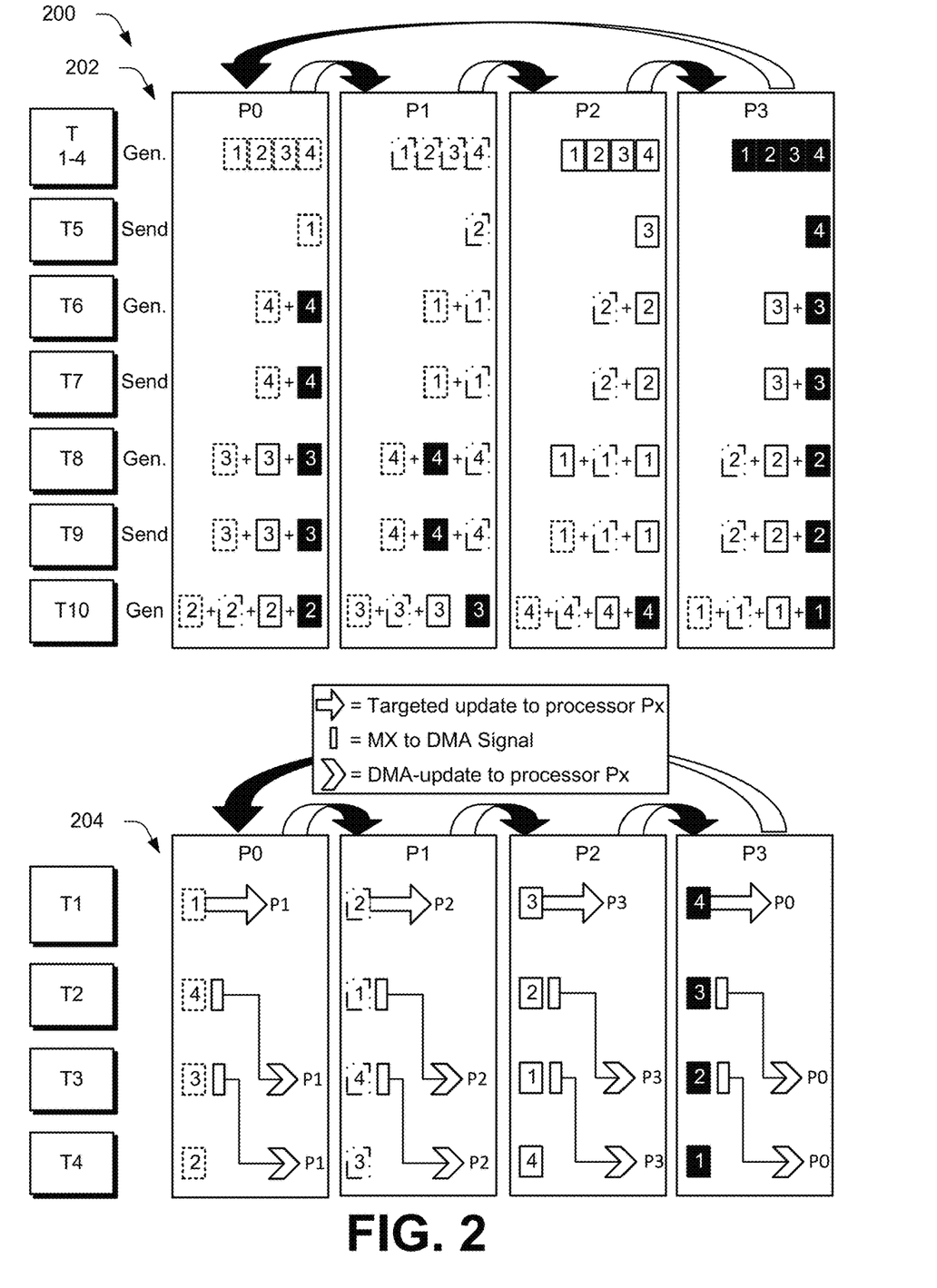
FIG. 2 is a block diagram of a non-limiting example of data generation and associated communication in a machine-learning training example.

FIG. 2 is a block diagram of a non-limiting example 200 of data generation and associated communication in a machine-learning training example. This example illustrates data generation using a GEMM operation followed with associated communication using a reduce-scatter operation.

In the depiction of a reduce-scatter primitive of FIG. 2, an array with four partitions is shown that is to be reduced across four nodes (e.g., examples of processor 116 illustrated as "P0," "P1," "P2," and "P3") connected over a ring topology. In a first example 202 of a baseline system, each node (i.e., processor P0-P3) first undergoes a data generation process via a GEMM operation. GEMM operations as used in machine learning typically involve significant amounts of data that is generated in multiple steps, illustrated as four timesteps "T1-4."

After data generation, a reduce-scatter operation is invoked. To realize this operation, nodes "P0-P3" communicate a partition worth of data and invoke a reduction kernel to reduce the received partition using a locally available partition, which takes two timesteps in a steady state. Overall, for four partitions over four nodes, this is done thrice, e.g., each node sends three partitions, performs three local reductions, and receives three partitions. In the illustrated example, this consumes ten timesteps for data generation (GEMM) and associated communication (reduce-scatter) in a four-node system. After the completion of reduce-scatter primitive, nodes are also configurable to share reduced partitions between nodes.

In the second example 204, on the other hand, the targeted communication module 118, data generation and communication tracking module 120, and updates convergence unit 122 are used to implement mechanisms to perform the communications and reductions as each word (or sets of words) of the data is being generated. As a result, generation and communication are overlapped at what is referred to as a "fine granularity" in the following discussion. The techniques described herein also support an ability to program "coarse grain" updates by a data mover engine 106 (e.g., direct memory access "DMA") as data is generated. Both scenarios support programming of these updates to implement a wide range of communication patterns.

In an example, the techniques described herein track data generation using the data generation and communication tracking module 120 to opportunistically transmit (e.g., "push") generated data to other nodes as "fine-grained targeted updates." In a second scenario, the targeted communication module 118 leverages tracking performed by the data generation and communication tracking module 120 to trigger updates, e.g., as targeted updates orchestrated by the data mover engine 106. The specific actions to be invoked, and address ranges to be tracked are fully programmable, e.g., by a programmer or as part of an operating system. Through use of the techniques described herein, both data generation and associated communication are completed in the second example 204 in four timesteps as compared to ten timesteps in the first example 202 of a baseline system. The benefits of these techniques increase as the amount of data to be processed also scales.

As device count and GEMM sizes increase, these technical benefits further increase, e.g., a number of devices of "n," in a baseline involves "$\{2(n-1)+n\}$" steps whereas the techniques described herein involves "n" steps. At a large number of "n" and GEMM sizes, this operates to reduce timesteps by three times. Further, the techniques described herein are also configurable to utilize both compute and network resources concurrently, instead of in a serialized manner as in a baseline scenario.

Figure 3:
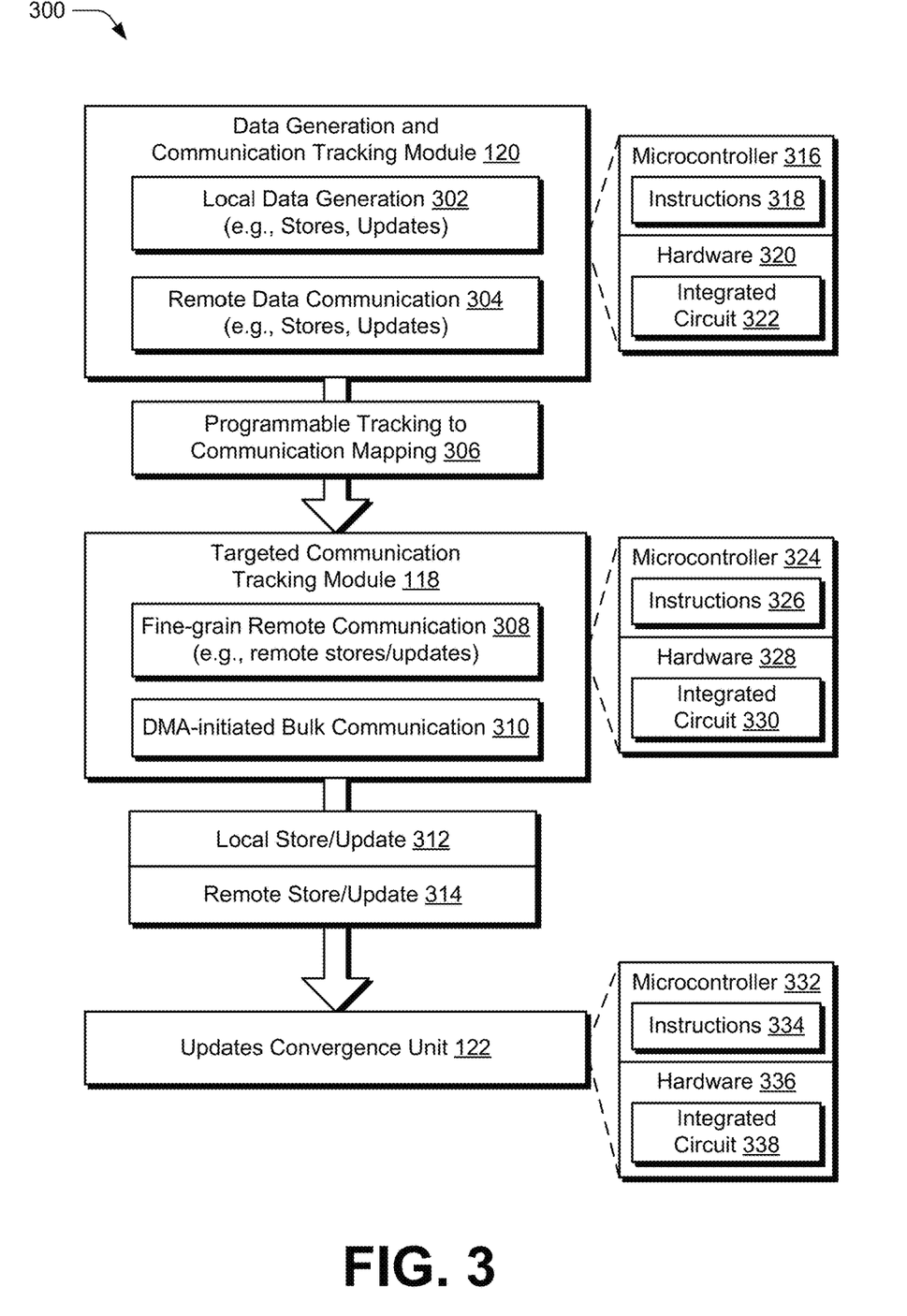
FIG. 3 is a block diagram of a non-limiting example of a data generation and communication tracking module, targeted communication module, and updates convergence unit of FIG. 1.

FIG. 3 is a block diagram of a non-limiting example 300 of the data generation and communication tracking module 120, the targeted communication module 118, and the updates convergence unit 122. These modules represent three logical parts of the described techniques that support fusion and overlap of data generation and associated computation.

The data generation and communication tracking module 120 is representative of functionality involving operations to implement low-overhead tracking of both local data generation 302 and remote data communication 304, e.g., remote stores, DMA transfers, and so forth) as part of implementing a programmable tracking to communication mapping 306. This supports a programmatic ability to effectively condition communication of data based on progress and/or completion of data generation (e.g., local or remote) as well as on other communication, thus allowing for fusion of data generation and communication. The data generation and communication tracking module 120, for instance, supports structures and mechanisms to allow a programmer to program and map targeted communication (e.g., to defined processors and/or address ranges) to specific data generation and/or communication events.

The data generation and communication tracking module 120, for instance, is configured to implement operations to track address ranges and perform the following:

Forward=Y, DMA=N: Issue read-modify-update locally and to defined processor;
Forward=N and DMA=Y: If local_counter=remote_counter=threshold, signal the data mover engine;
Forward=N and DMA=N: If local_counter=remote_counter=threshold, signal protocol completion.

The targeted communication module 118 is representative of functionality to perform operations and implement mechanisms to target data communication based on configurable conditions triggered by tracking performed by the data generation and communication tracking module 120. This includes fine-grained remote communication 308 and DMA-initiated bulk communication 310 as described above. Examples of direct memory access augmentations as implemented by the targeted communication module 118 include "On memory control signal for address-range x, read address-range from local memory and initiate read-modify-update to correct address range y in defined processor."

The updates convergence unit 122 is implements operations to support scenarios involving computation associated with a communication, e.g., addition for reduce-scatter. This is performed through use of convergence mechanisms to allow concurrent updates to data from local store/updates 312 and remote store/updates 314.

Communication of the data is initiated in a variety of ways, e.g., based on completion of local data generation, a remote communication event, and so forth. To support this, the data generation and communication tracking module 120 implements lightweight tracking of data generation and communication using augmentations to a memory controller 108, e.g., using a table structure. This tracking is harnessed to trigger targeted fine-grained memory operations (e.g., updates to pre-programmed remote nodes triggered when local updates are generated) and/or targeted DMA-orchestrated memory operations, e.g., programmed into targeted communication tracking by a data mover engine 106.

Support of "fine-grain" and "bulk" operations through direct memory access supports numerous technical advantages. In a first example, fine-grain memory operations support immediate conveying of locally generated data to remote nodes in a programmable fashion. In some instances, however, this can lead to high inter-node traffic. Further, data communication can be conditioned on remote communication in addition to local generation. To address this, DMA-orchestrated bulk communication is configured to implement multiple communication events, e.g., to support triggering of communication transmission over multiple words. Further, programming as described herein also supports specific communication patterns to be triggered at completion of data generation or communication event as further described in relation to FIG. 6.

The data generation and communication tracking module 120, the targeted communication module 118, and the updates convergence unit 122 are implemented in any of hardware, software, firmware, or a combination thereof. In the illustrated example, the data generation and communication tracking module 120 is configurable using a microcontroller 316 operable to execute instructions 318 as a special purpose machine to achieve a result of generating a programmable tracking to communication mapping 306. In another example the data generation and communication tracking module 120 is configured as least in part using hardware 320 (e.g., an integrated circuit 322 such as an application specific integrated circuit) to generate a programmable tracking to communication mapping 306.

Likewise, the targeted communication and tracking module 118 is also configurable using a microcontroller 324 that is operable to execute instructions 326 as a special-purpose machine to achieve a result of generating a local store/update 312 and a remote store/update 314. In another example, the targeted communication module 118 is configured as least in part using hardware 328 (e.g., an integrated circuit 330 examples of which include an application specific integrated circuit) to generate the local store/update 312 and a remote store/update 314.

Further, the updates convergence unit 122 is also configurable using a microcontroller 332 that is configured to execute instructions 334 as a special-purpose machine to implement convergence mechanisms that support concurrent updates using the physical memory 112. In another example, the updates convergence unit 122 is configured at least in part using hardware 336 (e.g., an integrated circuit 338 such as an application specific integrated circuit) to implement a convergence mechanism that supports concurrent updates using the physical memory 112.

As discussed above, in some scenarios data generation associated communication involves a computation, e.g., reduction. To support this, the infrastructure 100 allows concurrent local data generation (with update) while allowing remote updates to data. This is provisioned in the techniques described herein using near/in-memory processing by the updates convergence unit 122. The updates convergence unit 122 is configured to leverage physical memory 112 (e.g., main memory) as a synchronization point. To do so in one example, data generation is implemented solely using updates instead of using stores. Additionally, implementation of the updates is performed by the updates convergence unit 122 and therefore both local store/updates 312 and remote store/updates 314 are performable concurrently at a low synchronization cost.

Figure 4:
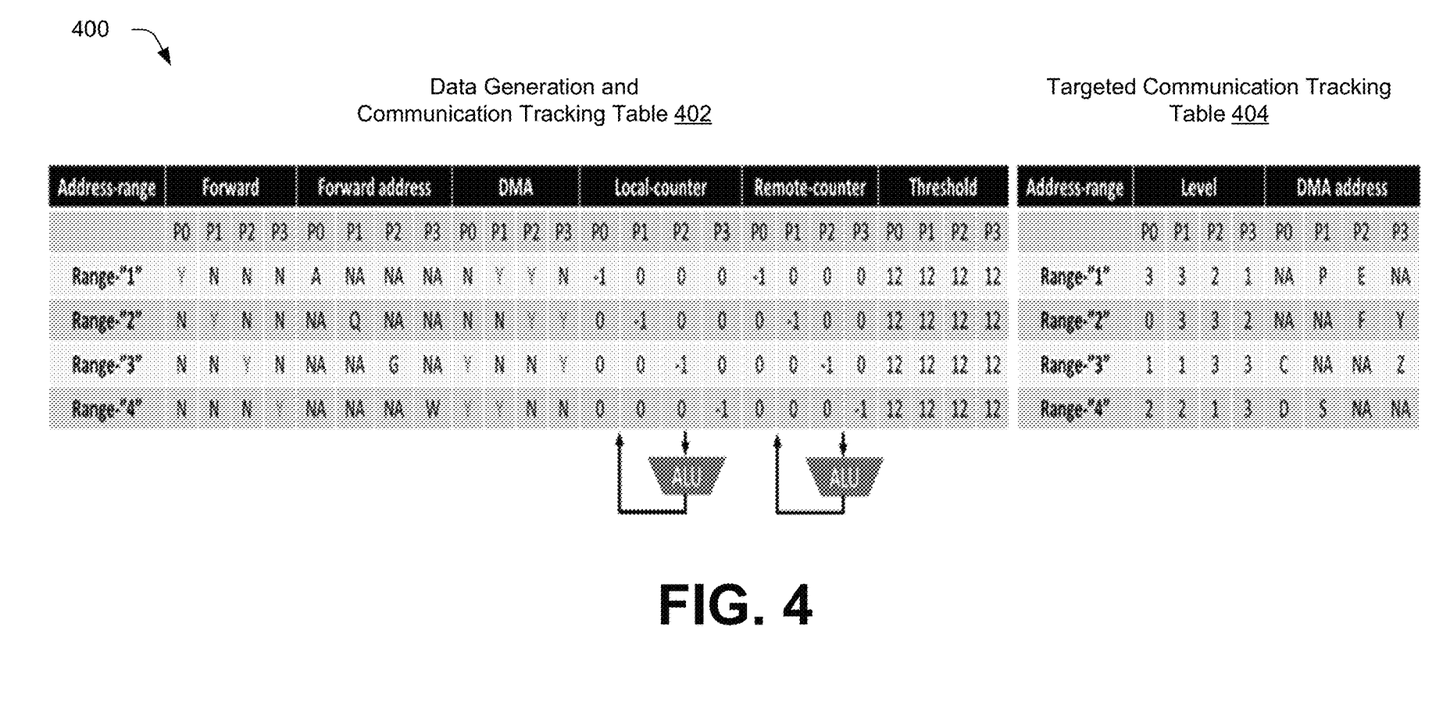
FIG. 4 is a block diagram of a non-limiting example of data generation and communication tracking in support of a fused reduce-scatter operation.

FIG. 4 is a block diagram of a non-limiting example 400 of data generation and communication tracking in support of a fused reduce-scatter operation. In the illustrated example, a data generation and communication tracking table 402 as implemented by the data generation and communication tracking module 120 is shown. Likewise, a targeted communication tracking table 404 as implemented by the targeted communication module 118 is illustrated. In the illustrated example of FIG. 4, each of the entries at each nodes are included in each of the tables. In practice, however, each node is also configurable to store the tables entries pertaining to itself, e.g., node "P0" stores columns marked as "P0."

The data generation and communication tracking table 402 is configured for use in tracking address ranges. For each range, data generation and communication tracking module 120 as implemented by the memory controller 108 tracks both local stores/updates and remote stores/updates as shown in FIG. 3 using a local-counter and remote-counter, respectively. The data generation and communication tracking module 120 also tracks, for a given address range, if a fine-grained local and/or remote update is to be triggered. The data generation and communication tracking module 120 tracks if a DMA-orchestrated communication (e.g., update) is to be triggered based on either local data generation or completion of communication event, e.g., "remote updates=threshold, remote updates=local updates=threshold," and so forth. This is usable for both contiguous and non-contiguous address ranges in memory, e.g., using strides, multi-dimensional, or indirect access patterns.

The techniques described herein fuse data-generation and associated communication. To that end, these techniques support an ability to program fine-grain updates or coarse grain direct memory access orchestrated updates as data is generated. This supports an ability to programmatically implement any desired communication pattern.

In one such scenario, a reduce-scatter operation is programmatically implemented over a ring network as shown in FIG. 2. Specifically, stores to certain address ranges are tracked by the data generation and communication tracking module 120 of the memory controller 108 (e.g., address range "1" at node P0) and immediately forwarded to designated address in a designated node, e.g., P1 in ring topology, address range "A." At the same time, stores are issued as read-modify-updates both locally/remotely as reduce-scatter involves a reduction operation. Further, programming is implemented such that when local updates and remote updates to certain address ranges reach a threshold (e.g., address range "3" on P0, threshold=12), the memory controller 108 is programmed to signal this event to the data mover engine 106. The data mover engine 106, through the targeted communication module 118, in turn triggers preprogrammed targeted communication event, e.g., update DMA address range "C" on P1 using values read from P0 address range "3."

Nodes are programmable in a variety of ways, such as at boot time for static network topologies or programmed per communication event. Further, while the description above refers to nodes as communication entities, in alternate implementations, other components in the system (e.g., switch, programmable accelerator) are also configurable as communication nodes. Additionally, while also not depicted, conditions (e.g., local updates=remote updates=threshold for reduce scatter) and/or operations (e.g., read-modify-update for reduce-scatter) are also programmable as specific to an operation, application etc.

While several data generation and associated communication scenarios simply involve communication (e.g., all-to-all in machine learning training), alternate scenarios are also contemplated where communication has an associated compute operation, e.g., reduction operation in reduce-scatter. To support these alternate scenarios, a low overhead synchronization substrate is implemented by the updates convergence unit 122 which supports concurrent data generation and remote updates to data. The updates convergence unit 122, for instance, is configured to process both local and remote updates to data.

In the above example of reduce-scatter, data generation stores are expressed as updates. This is accomplished in one implementation via software-level change, e.g., via page-table and/or cache level mechanisms which direct stores to specific address range to bypass caches allowing the memory controller to transform local data-generation stores to updates. Further, memory operations to remote nodes (due to "Forward" flag) or direct memory access orchestration are also transformed into updates. Each of these updates are offloaded to the updates convergence unit 122 for completion.

The updates convergence unit 122 is configurable in a variety of ways. In a first example, the updates convergence unit 122 is implemented as a dedicated unit in a single level in a memory hierarchy such as it can be housed either at memory side cache, memory controller, in base die of 3D memory stacks, near DRAM banks and so forth. In scenarios where the updates convergence unit 122 is placed at multiple levels, updates convergence units which process a same address are coordinated with each other to ensure proper application of local/remote updates.

Figure 5:
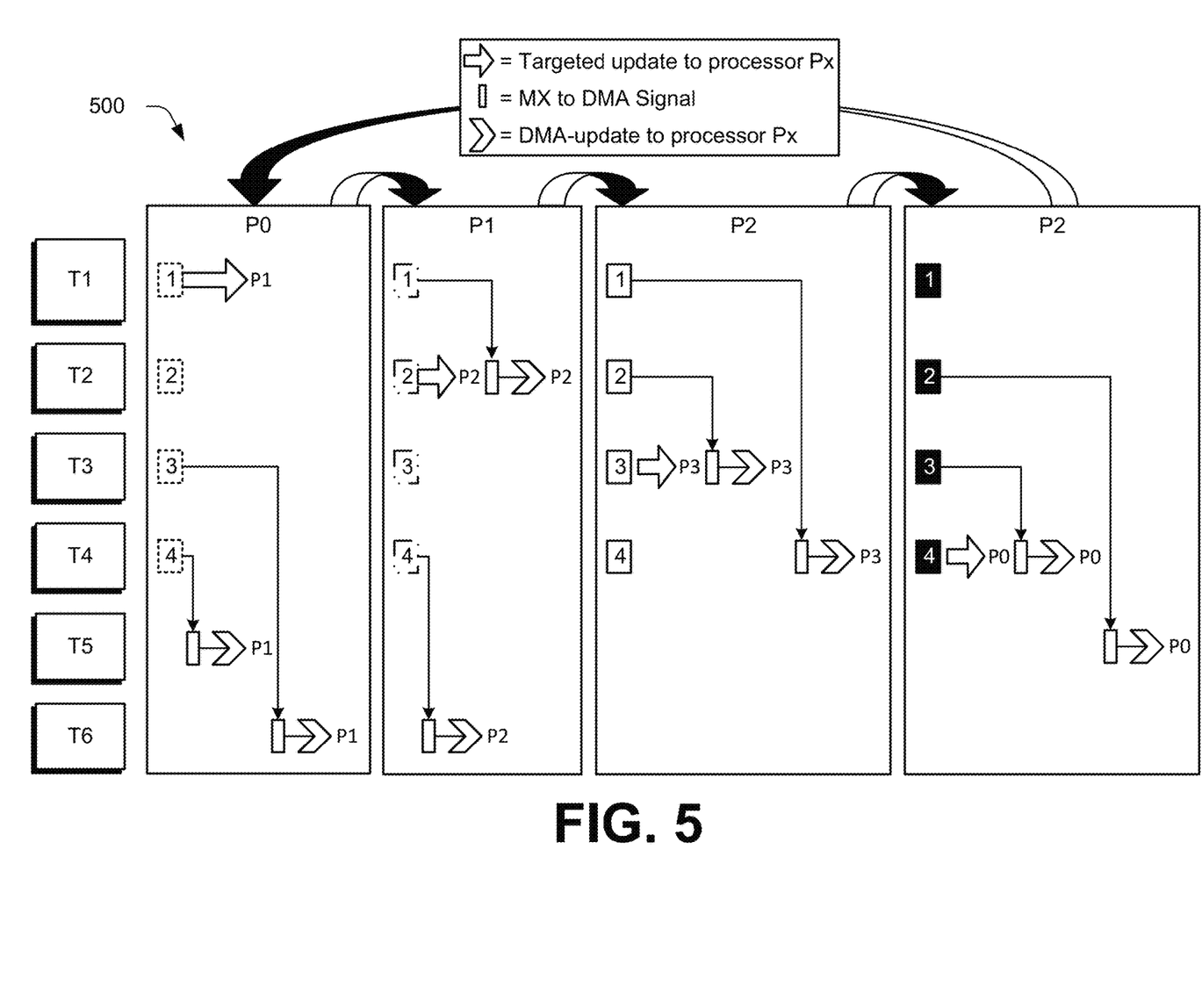
FIG. 5 is a block diagram of a non-limiting example of unordered data generation.
Figure 6:
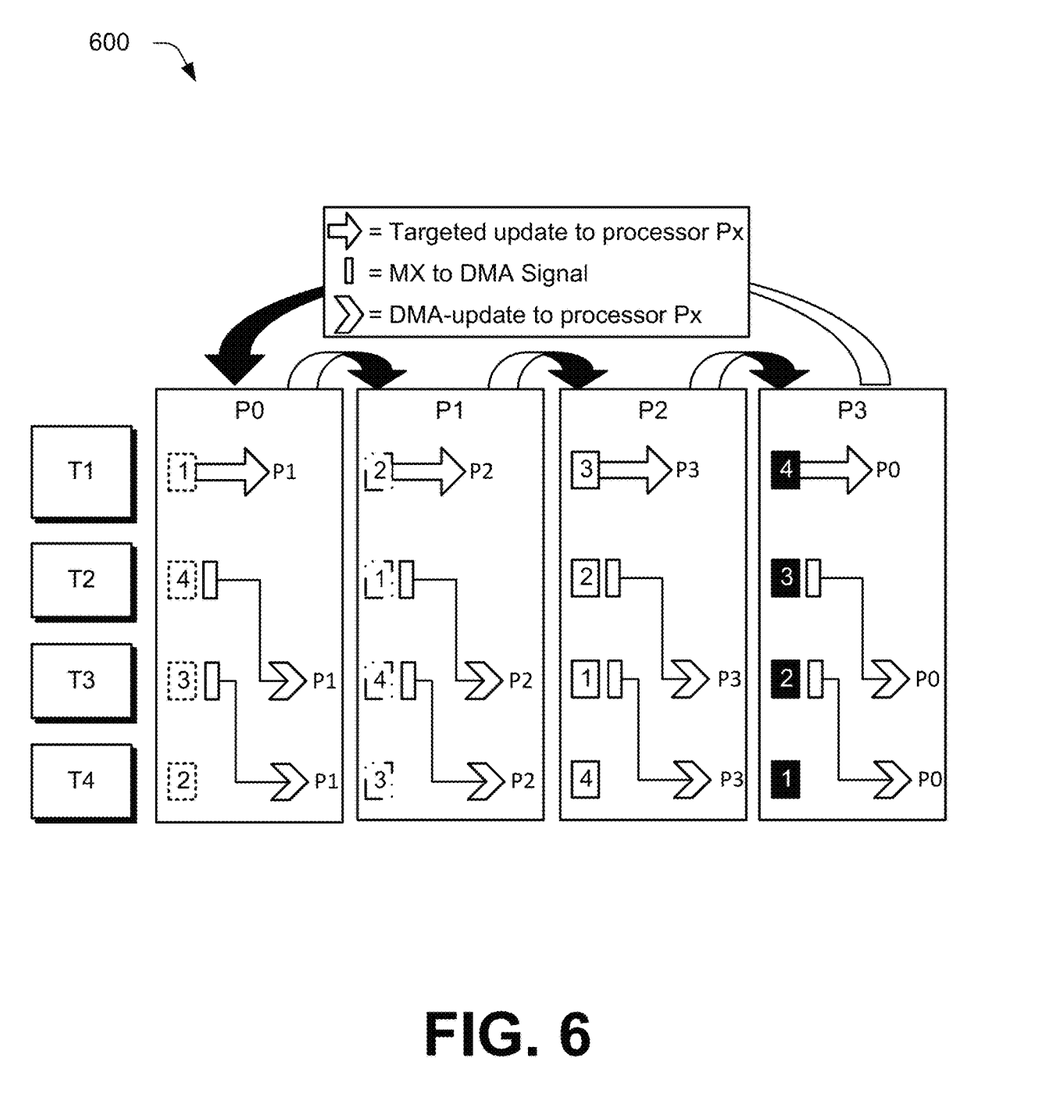
FIG. 6 is a block diagram of a non-limiting example of ordered data generation.

FIG. 5 is a block diagram of a non-limiting example 500 of unordered data generation. FIG. 6 is a block diagram of a non-limiting example 600 of ordered data generation. Data generation order directly affects a communication pattern used to communicate the data. Therefore, by controlling data-generation order, fused data-generation and associated communication efficiency is increased. In the example 500 of unordered data generation in which the order is not controlled, fused data generation and associated communication is completed in six time steps. In the example 600 of FIG. 6, however, data generation is ordered to increase efficiency, e.g., fused data generation and associated communication are completed in four time steps.

In further implementations, priority information is programmable into targeted communication tracking (TCT) table at the data mover engine 106 to prioritize certain communications over the other to further shorten the critical path. This is illustrated in FIG. 6 at node P0 to prioritize communication for address range "4" first instead of range "3."

While fusion of data-generation and associated communication has performance benefits, such fusion can lead to higher concurrent memory traffic than serializing data-generation and communication. As such, mechanisms are implemented as part of the infrastructure 100 to manage interference. As an example, communication memory traffic is deprioritized while data-generation is not complete. Although these examples involve a reduce-scatter operation, the techniques described herein are also usable to forward remote communication in a fine-grain manner to designed nodes.

Figure 7:
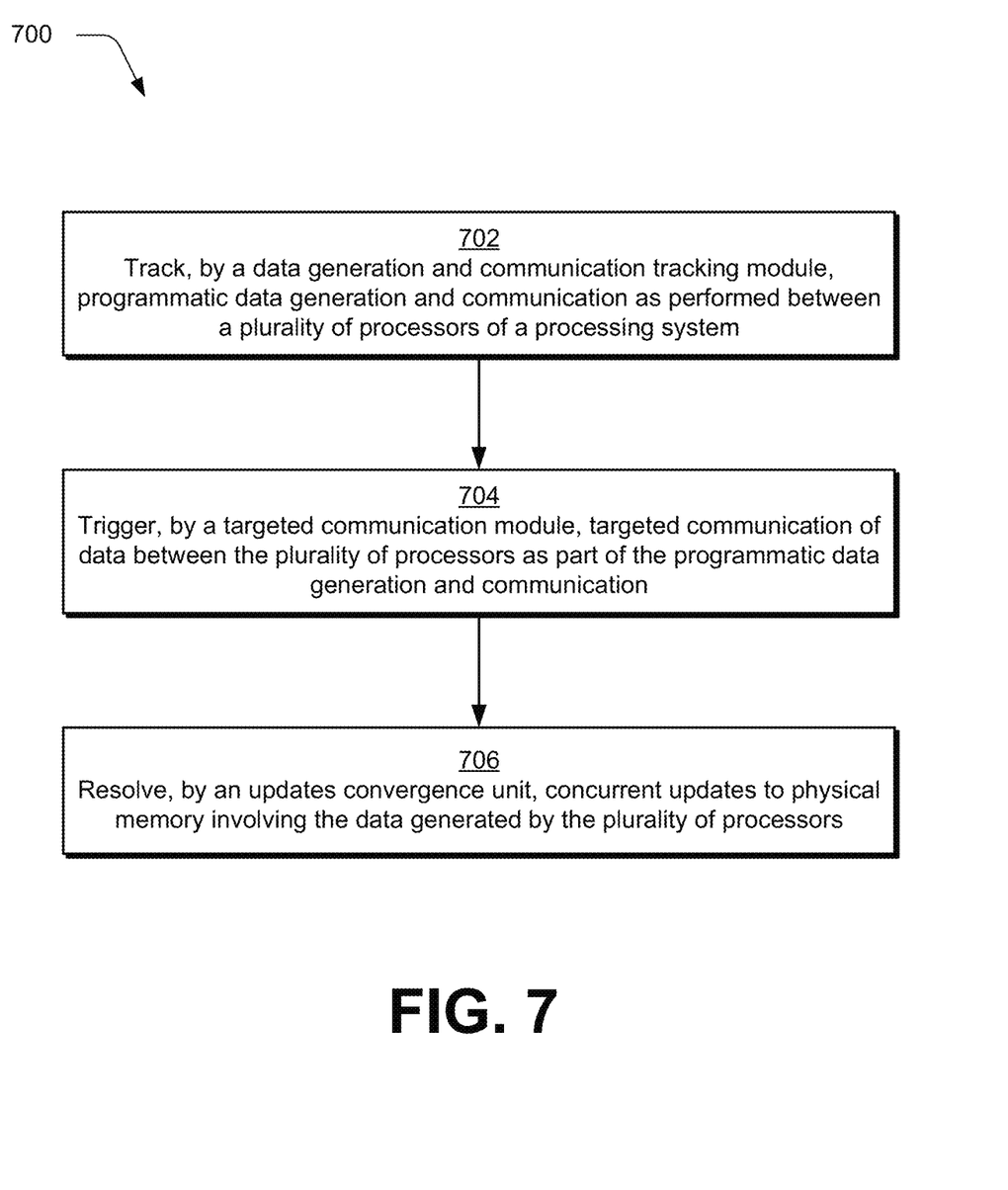
FIG. 7 is a flow diagram of a non-limiting example of fused data generation and communication.

FIG. 7 is a flow diagram of a non-limiting example 700 of fused data generation and communication. A data generation and communication tracking module tracks programmatic data generation and communication as performed between a plurality of processors of a processing system (block 702). By way of example, the data generation and communication tracking module 120 implements a data generation and communication tracking table 402.

A targeted communication of data between the plurality of processors is triggered as part of the programmatic data generation and communication (block 704). By way of example, the targeted communication module 118 triggers the communication based on the tracking performed by the data generation and communication tracking module 120.

Concurrent updates are resolved to physical memory by an updates convergence unit involving the data generated by the plurality of processors (block 706). By way of example, the updates convergence unit 122 resolves local store/updates 312 and remote store/updates 314 to physical memory 112.

In the above examples, the techniques described herein support an infrastructure which effectively fuses data generation and associated communication in a programmable fashion. This implements a variety of technical advantages, including but not limited to, improved performance, utilization of both computation and network resources concurrently instead of serialized utilization, offloading of communication from main processor (CPU/GPU) as communication is programmed once and implicitly triggered based on completion of data generation and/or communication, lower kernel launch costs and so forth. In the following discussion, these techniques are used in an implementation example for use in fine-grained in-memory reduction-based collectives.

Reduction-based collectives are utilized are part of training for natural language processing applications in multi-device setups. These collectives involve communication and reduction of data from multiple devices and are used to aggregate gradients (in data-parallel setups) or activations (in model parallel setups) during training.

These collectives, however, are often serialized with application execution and can become a bottleneck, causing performance to scale sub-linearly with increasing device count during training. Data used by these collective operations, however, is typically not produced at the same time. Data generated by matrix multiplication (GEMM) operations, for instance, execute in multiple stages with a set of workgroups per stage. Thus, in an implementation communication and reduction of data from a single GEMM stage is overlapped in a fine-grained manner with the execution of a next GEMM stage. This reduces a cost of collective operation with a producer kernel.

There are several challenges to implement this functionality. For example, producer and collective operations are generally implemented as separate kernels in graphics processing units which involve computationally expensive synchronization if executed in a fine-grained manner. Additionally, contention for both compute and memory resources by the collective and producer GEMM stage can degrade overall performance.

To overcome these challenges, a hardware/software mechanism is described to transparently execute the producer and collective operations in a fine-grained manner. This is performed by leveraging an address space to initiate fine-grained communication of data automatically on the producer's store instruction, and as such is performable without modifications to the kernel. Furthermore, these techniques leverage near-memory compute units to atomically update memory locations on a store, thus limiting contention with the producer operation. Thus, this mechanism reduces a cost of communication and frees up compute resources (e.g., of a graphics processing unit) from performing reductions. This enables efficient near-linear scaling of training with increasing device count. Furthermore, this mechanism accelerates collectives (via fewer memory accesses) while also improving the overall utilization of compute and network resources.

For example, large network matric multiplication operations (GEMMs) execute and generate data in multiple stages. Additionally, GEMMs from transformer models often have large output sizes, which are tiled/blocked and involve a large number of workgroups (WGs) or thread blocks (TBs) to compute. These workgroups, in practice, typically do not execute at once due to a finite number of graphics processing units or streaming multiprocessors. Instead, these are typically executed in stages, where each stage is a set of workgroups or thread blocks that are accommodated by the graphics processing unit. The number of stages is variable with respect to a GEMM size, shape, and the kernel implementation used. Therefore, output of a GEMM, and thus a layer, is typically not produced at once but rather in multiple stages. This holds true even when the operations are split across devices with model parallelism. This is because GEMMs which are split across devices and involve an "all-reduce" collective are typically split in the 'K' dimension. Therefore, work performed a by thread or workgroup in each of the sub-GEMMs is generally smaller (e.g., dot product of shorter rows and columns) but the output matrix size generated by each remains the same as an original GEMM. This means the number of threads/WGs, and thus stages executed by each of the sub-GEMMs remains similar.

This insight is leveraged by the mechanism described herein to overlap reduction/communication (e.g., "all-reduce" operation) of data with data generation. For example, communication of data generated by a stage is overlapped and operation of which is "hidden" with data generation (compute) of a next stage.

The mechanism described herein, for instance, transparently enables fine-grained execution of collective operations with producer GEMMs by having GEMM writes automatically trigger the communication/reduction of the generated data. This is performed by allocating an output of the GEMM within an address space while keeping the GEMM kernels unchanged. The reduction is then handled entirely in hardware in this example.

Additionally, overlapping GEMMs and collectives can also cause contention for graphics processing unit resources and slow down overall execution. There are two sources of contention between GEMMs and collectives. The first is competition for compute units of graphics processing which can slow performance of GEMMs. Second, a reduction operation is memory-intensive and can compete for memory bandwidth with the producer GEMM operation. To address this in one example, a collective operation is initiated automatically on GEMM writes to the address space. As such, additional compute units are not involved in order to execute the collective. Furthermore, these writes are converted to updates on the fly and are handled by arithmetic logic units near memory and as such include minimal additional memory overhead than the original GEMM write.

Figure 8:
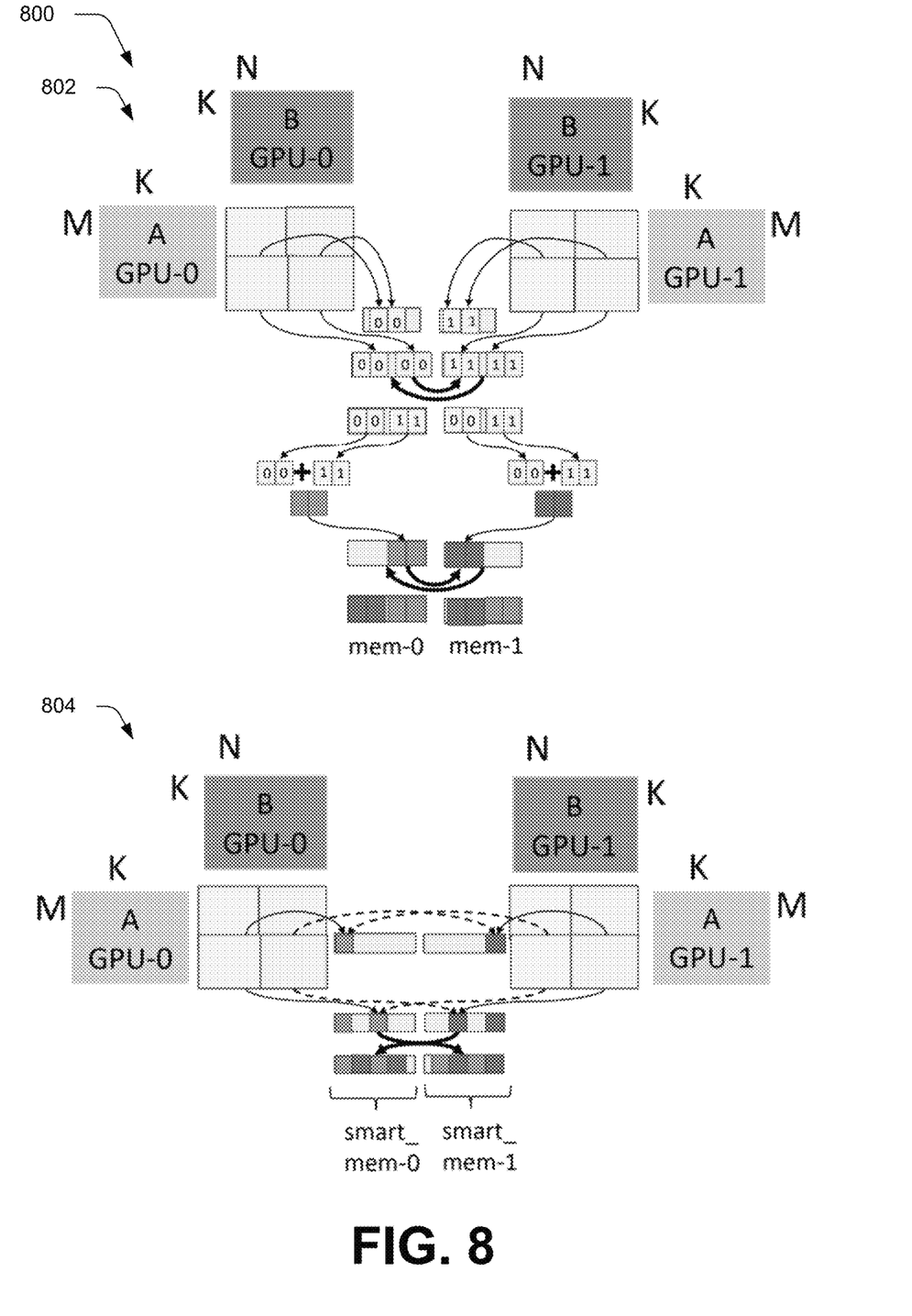
FIG. 8 is a block diagram of a non-limiting example of a baseline system versus a fine-grained in-memory reduction-based collective system.

FIG. 8 is a block diagram of a non-limiting example 800 of a baseline system 802 versus a fine-grained in-memory reduction-based collective system 804. The fine-grained in-memory reduction-based collective system 804 is illustrated as an "all-reduce" collective in a simple two-device system.

In the baseline system 802, the graphics processing units first execute respective producer GEMMs and store the outputs in local memory. The graphics processing units next initiate a reduce-scatter operation in which each graphics processing unit reduces a "chunk" (i.e., it is the home node for the chunk) of the output array. This entails direct memory access transfers (or peer-to-peer copies) to ensure that each graphics processing unit has each of the copies of the chunk, for which, it is responsible. This is followed by memory loads of the copies by each graphics processing unit, reduction by the graphics processing unit, and local store of the reduced version. A final transfer (e.g., broadcast) of the reduced version of the chunks to the remaining devices is performed to complete the "all-gather" operation. A total number of load/stores from memory is dependent on a topology, device count, and algorithm (e.g., ring vs direct) used by the baseline system 802.

In the fine-grained in-memory reduction-based collective system 804, on the other hand, collectives are transparently executed in a fine-grained manner with the producer GEMM operations, with the collective's execution time "hidden." To execute the reduce scatter operation in this example, instead of directing each of the GEMMs writes to local memories, the writes are instead directed either to local (if home node for the array elements) or remote memory locations. Furthermore, the writes to specified locations in this example atomically update the data there using near-memory arithmetic logic units. Thus, each home memory location contains a reduced version of the data in its entirety once it has received writes from each of the involved devices. Following this, the chunks are transferable to other devices to complete the "all-gather" operation for the data.

Thus, in this example reduce-scatter of data is overlapped with data generation. It is orchestrated in this example completely in hardware, thereby reducing software complexity and further reducing total memory traffic. As shown in FIG. 8, for instance, data corresponding to each element is read/written nine times to local/remote memory in the baseline system 802 vs four times for the fine-grained in-memory reduction-based collective system 804 due to concurrent execution of the GEMM and collective.

The mechanism described herein includes support for initiating communication/reduction of data automatically on a producer's write instruction. The mechanism also leverages near-memory computing to atomically update the memory location. To do so, the mechanism implements an address space for transparent fusion of producer and collectives.

In order to avoid the complexity of fine-grained collectives in software and to avoid modifying the implementation of hundreds of GEMM kernels from extensive libraries, fine-grained execution is implemented in this example of the producer GEMM and collective operation transparently in hardware. To do so, the output of the producer GEMM is allocated in an address space such that writes to the address space automatically execute the required collective.

As shown in FIG. 8, writes are usable to trigger three types of actions, local, remote, and direct memory access (DMA). Furthermore, the memory location and sequence of these actions can differ for different types of collectives (e.g., all-reduce, reduce-scatter) and techniques, e.g., ring, direct. Accordingly, a system implementing the mechanism described herein is configured to support memory mapping APIs, which are usable to configure the allocated memory for the different write-initiated actions for the different collective types and techniques.

This mechanism is configurable using a library with pre-defined memory mappings that is "called into" by respective applications. In a four-GPU all-reduce operation, for instance, memory is allocated on each device in the address space, e.g., by specifying a collective and mechanism. This function first allocates an array on each device. For an "all-reduce" operation, local allocation of an entire array is performed on each device to gather a final reduced version of an entire array on each device. This is followed by an API call to map sub-arrays of the local allocations to remote allocations of the array for remote writes. The output array on each device in the example is thus mapped to distributed physical memory. This mapping ensures that writes to the local sub-arrays are redirected as a remote write to the respective home nodes. Furthermore, it also defines what operations (e.g., update) are performed by the remote write operations. Once allocated, the GEMMs are executed which is then followed by additional direct memory access (or peer-to-peer copies) of the reduced data from the remote to local memories.

For memory allocations to the address space, writes to the address space are not cached by devices because the writes are not read locally until reduction is completed. Thus writes in this example are written through to physical memory 112, e.g., dynamic random access memory (DRAM). Furthermore, stores to these pages are either directed to local physical memory 112 if originating from the home node itself or directly to remote physical memory 112 to avoid redundant writes and reduce memory bandwidth pressure. This also ensures that there is a single point of aggregation for each of the copies of the data. This is implemented by extending a translation lookaside buffer and page tables to contain both local and remote physical address of pages in memory or via a separate hardware structure. A store to these locations, if to the local physical memory 112, are sent to the memory controller 108 whereas stores to the remote physical memory 112 are directed to a remote graphics processing unit memory controller.

Physical memory 112 on a home device is usable as an aggregation unit for each of the copies of an array. Local stores issued from the home device and remote stores from other devices are received and en-queued in the memory controller 108 to be later sent to the physical memory 112, e.g., the dynamic random access memory. Loads to these pages occur, solely, as part of a next graphics processing unit kernel. Each of the stores and direct memory accesses to the locations are ensured in one example to complete by a system scope fence inserted as part of a direct memory access function after the GEMM completes execution. As a result, loads are directed to a local copy by the translation lookaside buffer and page tables.

In a DRAM architecture with near-memory compute support, each bank is associated with an arithmetic logic unit (ALU) and registers to store intermediate values. Thus, stores to these memories are usable to update the memory locations. DRAM banks associated with the address space of the techniques described herein, therefore, are programmable to update memory locations on store commands.

Such updates first write the store values to the registers associated with the near-memory arithmetic logic units, activate the corresponding memory rows, read and add the column values from the row buffers to the data in the registers, and write the reduced value back to the buffer. The queuing of the store or near-memory updates in a memory controller 108 queue promotes atomicity of these updates such that at a given time, a single instruction is issued to and executed in the arithmetic logic unit corresponding to a memory location. Additionally, converting these stores to atomic updates on the fly does not violate a graphic processing unit's memory consistency guarantees. These updates are commutative atomics in characteristics and thus, similar to stores, can be re-ordered with respect to other relaxed atomics, which are also stores in this case. In an example, these stores/updates in the queues are coalesced by a memory queue coalescer to improve performance.

Coalescing multiple updates to the same location helps to reduce the number of row activations and/or row buffer reads/writes. Overall, these near-memory update-based reductions reduce and, in some cases, eliminate contention for memory resources with the executing GEMM. For a direct reduce-scatter operation, a total number of memory operations involved for reductions are the same as what a GEMM performs in isolation.

Figure 9:
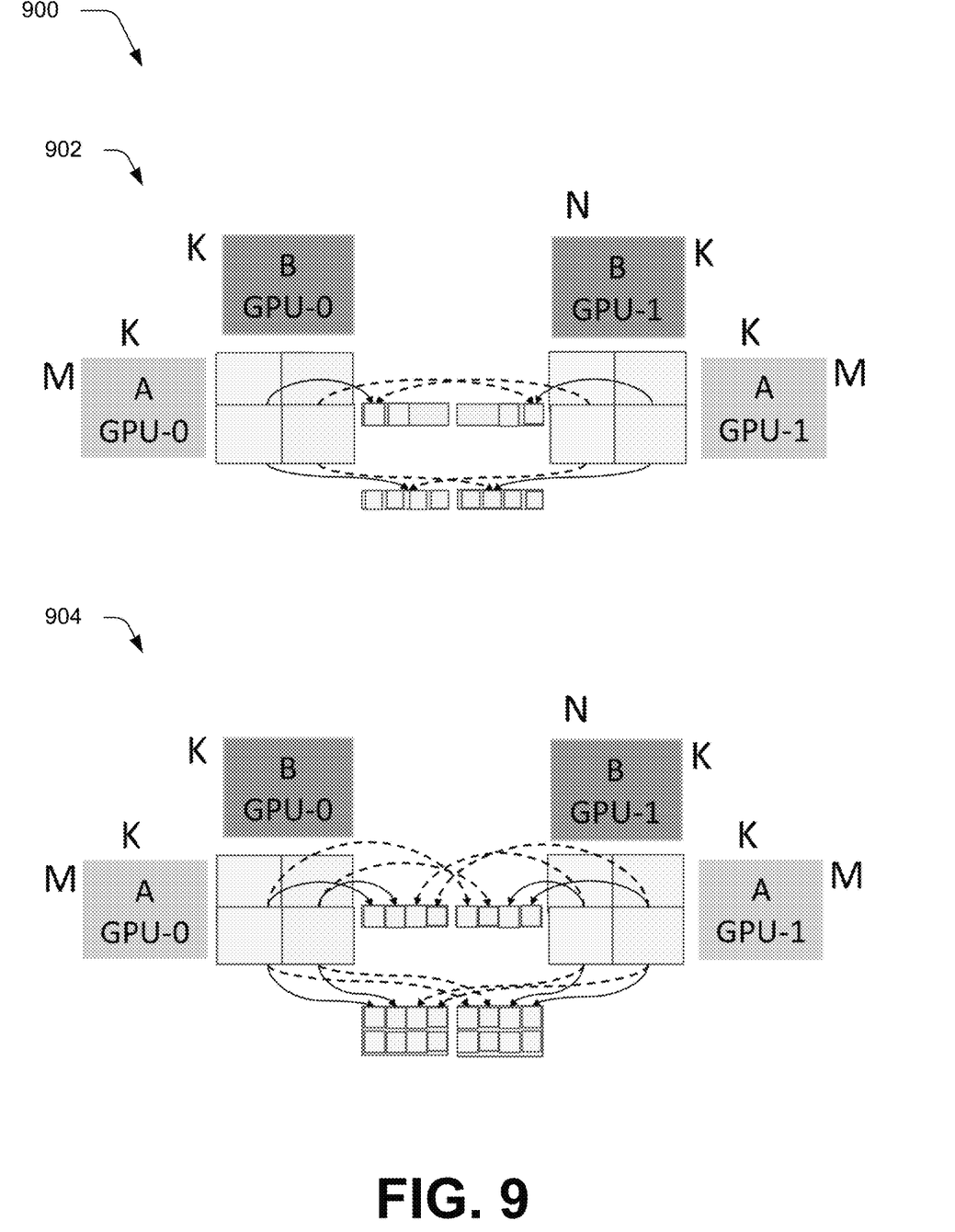
FIG. 9 is a block diagram of a non-limiting example of a fine-grained all-to-all operation and an all-gather operation.

FIG. 9 is a block diagram of a non-limiting example 900 of a fine-grained all-to-all operation 902 and an all-gather operation 904. A traffic pattern of the all-to-all operation 902 matches those of the all-reduce collective and thus can utilize a same configuration as that shown in FIG. 8, except that writes do not update memory. The all-gather operation 904, on the other hand, is implemented by directing GEMM writes to both local and remote memories.

Additionally, collective (e.g., "all-reduce") operations in natural language processing applications are typically followed by other memory-intensive operations (e.g., parameter updates in data-parallel setups or residual/dropout layers in model-parallel setups) on each of the participating devices. These operations, however, consume an entirety of a reduced array on each device and thus are redundant in some instances. Therefore, performance of reductions in memory provides an opportunity to limit such redundant operations. The consumer operations, which can also be executed using near-memory arithmetic logic units, operate on (reduced) sub-arrays of data on home nodes, before being "all-gathered" or broadcasted to the remaining devices. This reduces redundant computations and further improves distributed natural language processing performance.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
a processing system including a plurality of processors for training a machine learning model; and
a memory controller configured to:
track data generation by the plurality of processors and associated communication of the generated data between the plurality of processors during the training of the machine learning model; and
trigger targeted communication of the generated data between the plurality of processors based on the tracked data generation and associated communication.

2. The system of claim 1, wherein the data generation and associated communication of the generated data includes generation of the data by at least one processor of the plurality of processors and a targeted update to transmit the data by the at least one processor to another processor of the plurality of processors.

3. The system of claim 2, wherein the targeted update is triggered upon completion of the generation of the data by the at least one processor.

4. The system of claim 2, wherein the targeted update is triggered based on a remote communication event received at the at the at least one processor as implemented by a data mover engine by another processor of the plurality of processors.

5. The system of claim 4, wherein the remote communication event is part of a bulk operation involving communication of the data.

6. The system of claim 1, wherein the data generation and associated communication of the generated data are defined using a single fused data generation and associated communication operation.

7. The system of claim 6, wherein the fused data generation and associated communication operation identifies another processor of the plurality of processors to receive the data.

8. The system of claim 6, wherein the fused data generation and associated communication operation identifies an address range that is a source of the data or an address range that is a destination to transmit the data.

9. The system of claim 1, wherein at least one processor of the plurality of processors is configured to support concurrent updates to the data in physical memory.

10. The system of claim 9, wherein a processor-in-memory component of a memory module that includes the physical memory is configured to implement the concurrent updates.

11. The system of claim 1, wherein the data generation and associated communication of the generated data is configured to control a data generation order by respective processors of the plurality of processors.

12. The system of claim 1, wherein the training includes multiple stages and wherein targeted communication is triggered by causing communication of data generated by a first stage of the multiple stages of the training to overlap data generation of a next stage of the multiple stages of the training.

13. The system of claim 12, wherein the training comprises large network matrix multiplication (GEMM) operations, and wherein a GEMM write of generated data in the first stage automatically triggers communication of the generated data.

14. The system of claim 1, wherein the at memory controller is configured to track data generation and associated communication of the generated data by monitoring a table structure.

15. The system of claim 14, wherein the table structure includes table entries for each of the plurality of processors.

16. The system of claim 14, wherein the memory controller is configured to trigger the targeted communication by causing communication of generated data to specific processors of the plurality of processors.

17. A device comprising:
 a processing system including a plurality of processors for training a machine learning model; and
 a memory controller configured to:
  trigger communication of generated data between at least one processor and another processor of plurality of processors as part of data generation and associated communication of the generated data during the training of the machine learning model; and
  resolve concurrent updates to the generated data in physical memory.

18. The device of claim 17, wherein a processor-in-memory component of a memory module that includes the physical memory is configured to resolve the concurrent updates to the data in the physical memory.

19. A method comprising:
 tracking data generation and associated communication as performed between a plurality of processors of a processing system during training of a machine learning model;
 triggering targeted communication of data between the plurality of processors as part of the data generation and associated communication; and
 resolving concurrent updates to physical memory involving the data generated by the plurality of processors.

20. The method of claim 19, wherein the data generation and associated communication is configured to identify an address range that is a source of the data or an address range that is a destination to transmit the data.

* * * * *